(12) United States Patent
Miyazawa

(10) Patent No.: US 10,567,640 B2
(45) Date of Patent: Feb. 18, 2020

(54) IMAGE PICK-UP APPARATUS AND CONTROL METHOD THEREOF

(71) Applicant: CANON KABUSHIKI KAISHA, Tokyo (JP)

(72) Inventor: Hitoshi Miyazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/148,036

(22) Filed: Oct. 1, 2018

(65) Prior Publication Data
US 2019/0116308 A1 Apr. 18, 2019

(30) Foreign Application Priority Data

Oct. 12, 2017 (JP) .................................. 2017-198305

(51) Int. Cl.
*H04N 5/225* (2006.01)
*H04N 5/232* (2006.01)

(52) U.S. Cl.
CPC ..... *H04N 5/23218* (2018.08); *H04N 5/23254* (2013.01); *H04N 5/23267* (2013.01); *H04N 5/232939* (2018.08)

(58) Field of Classification Search
None
See application file for complete search history.

(56) References Cited

U.S. PATENT DOCUMENTS

| | | | |
|---|---|---|---|
| 2008/0111889 A1* | 5/2008 | Fujita | H04N 5/145 348/208.5 |
| 2009/0179994 A1* | 7/2009 | Miyazaki | H04N 5/23245 348/208.4 |
| 2009/0207259 A1* | 8/2009 | Ito | H04N 5/145 348/208.4 |
| 2012/0026346 A1* | 2/2012 | Lee | H04N 5/23222 348/208.1 |
| 2013/0027510 A1* | 1/2013 | Tsubusaki | H04N 5/23212 348/36 |
| 2013/0314511 A1* | 11/2013 | Chen | H04N 5/23222 348/50 |
| 2015/0288876 A1* | 10/2015 | Furuya | H04N 5/2353 348/169 |
| 2017/0223272 A1* | 8/2017 | Aoyama | G06K 9/00248 |
| 2018/0063436 A1 | 3/2018 | Miyazawa | |
| 2018/0063439 A1 | 3/2018 | Miyazawa | |

FOREIGN PATENT DOCUMENTS

JP 2006-317848 A 11/2006

* cited by examiner

*Primary Examiner* — Twyler L Haskins
*Assistant Examiner* — Dwight Alex C Tejano
(74) *Attorney, Agent, or Firm* — Venable LLP

(57) ABSTRACT

An image pick-up apparatus acquires a photographing distance and calculates angle information on the basis of a detection result of a motion vector in a panning state and a photographing distance. The image pick-up apparatus performs automatic photographing when the calculated angle information is a predetermined angle.

6 Claims, 8 Drawing Sheets

IMAGE PICK-UP APPARATUS AND CONTROL METHOD THEREOF

BACKGROUND OF THE INVENTION

Field of the Invention

The present invention relates to an image pick-up apparatus and a control method thereof.

Description of the Related Art

As one of photographing methods of cameras, there is panning in which photographing is performed while the camera is tracking the motion of a moving subject. At the time of performing panning, in order to accomplish a dynamic feeling for a subject, the shutter speed is set to be slower. In panning, it is difficult to successfully track and photograph a subject when the camera is shaking. Furthermore, it is not easy to set a shutter speed for accomplishing a dynamic feeling for a subject. An amount of background panning increases when the shutter speed is slower and thus a greater dynamic feeling is accomplished, but hand shake or subject shake is easily exhibited. Japanese Patent Laid-Open No. 2006-317848 describes an image pick-up apparatus which corrects image blur (subject shake) associated with a subject which is a panning target on the basis of an amount of motion of the subject and an angular velocity of a camera.

Regarding a photographing composition at the time of performing panning, for example, there is a composition in which capturing is performed horizontally from the camera with an angle formed by the subject and the camera (hereinafter referred to as a "subject angle") being a subject angle of 0° and a composition in which photographing is performed to be inclined at a subject angle of 30°. Particularly, in panning in a case in which a subject is, for example, an electric train, when photographing is performed at a subject angle of about 30°, a composition in which a headlight in the front of the electric train, the driver's cab, or a destination indicator is captured and panning is performed may be provided.

SUMMARY OF THE INVENTION

However, since an angle formed by a subject and a camera changes instantaneously when a subject speed is high, in the image pick-up apparatus described in Japanese Patent Laid-Open No. 2006-317848, photographing may not be able to performed at a desired subject angle even when subject shake can be minimized. The present invention provides an image pick-up apparatus capable of automatic photographing of a subject at a desired subject angle at the time of panning.

An image pick-up apparatus according to an embodiment of the present invention includes: a first detection unit configured to detect a panning state; a second detection unit configured to detect a motion vector on the basis of a captured image; an acquisition unit configured to acquire a photographing distance; a calculator configured to calculate an angle formed by the image pick-up apparatus and a subject on the basis of a detection result of the motion vector and the photographing distance; and a photographing controller configured to perform automatic photographing when the calculated angle is a predetermined angle.

Further features of the present invention will become apparent from the following description of exemplary embodiments with reference to the attached drawings.

DESCRIPTION OF THE EMBODIMENTS

Figure 1:
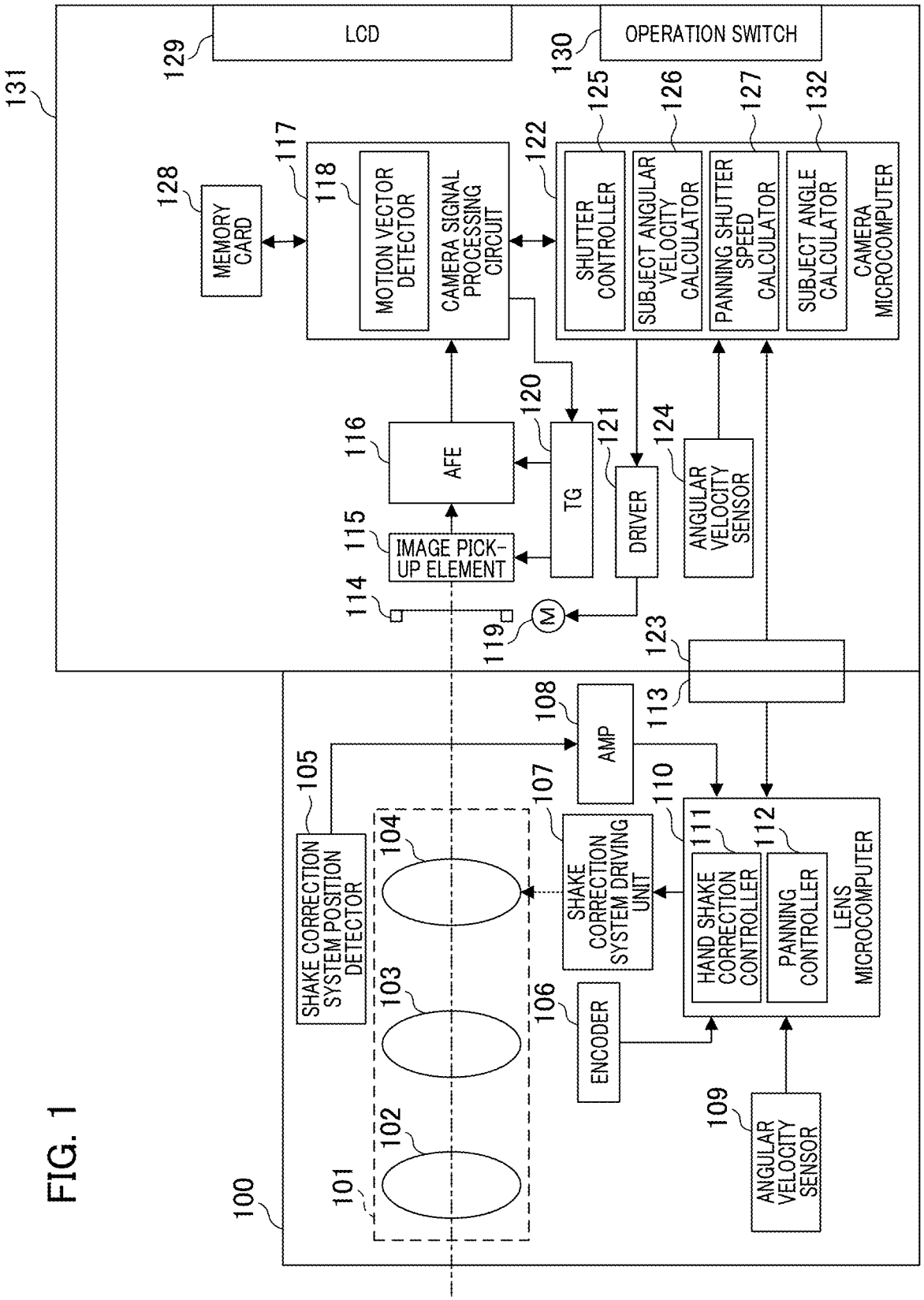
FIG. 1 is a diagram illustrating an example of a configuration of an image pick-up apparatus.

FIG. 1 is a diagram illustrating an example of a configuration of an image pick-up apparatus according to an embodiment.

The image pick-up apparatus illustrated in FIG. 1 includes a camera main body 131 and an interchangeable lens 100. The interchangeable lens 100 can be attached to and detached from the camera main body 131. Examples of the image pick-up apparatus illustrated in FIG. 1 include a compact digital camera, a video camera, a surveillance camera, a web camera, and the like. The present invention can also be applied to an image pick-up apparatus in which a camera main body and lenses are integrated.

The interchangeable lens 100 includes an imaging lens unit 101. The imaging lens unit 101 includes a main imaging optical system 102 and a zoom lens group 103 capable of changing a focal length. Furthermore, the imaging lens unit 101 includes a shift lens group (hereinafter referred to as a "shift lens") 104 functioning as a shake correcting means used for correcting image blur caused by shaking applied to the image pick-up apparatus. The shift lens 104 optically corrects hand shake or image blur associated with a subject when moving in a direction perpendicular to an optical axis. Furthermore, the interchangeable lens 100 includes a zoom encoder 106 configured to detect a position of a zoom lens group (hereinafter referred to as a "zoom lens") and a shake correction system position detector (position sensor) 105 configured to detect a position of the shift lens 104.

Also, the interchangeable lens 100 includes an angular velocity sensor (shake detecting means) 109 configured to detect shake of the image pick-up apparatus and a lens system control microcomputer (hereinafter referred to as a "lens microcomputer") 110. Furthermore, the interchangeable lens 100 includes a shake correction system driving unit 107 configured to drive the shift lens 104 and an amplifier circuit 108 configured to amplify an output of the position sensor 105. The interchangeable lens 100 includes a mount contact part 113 for the camera main body 131.

The lens microcomputer 110 includes a hand shake correction control unit 111 configured to perform hand shake correction control and a panning control unit 112 configured to control a panning assist mode. The panning control unit 112 and the shake correction system driving unit 107 function as shake correction control means for driving the shift lens 104 on the basis of a subject angular velocity calculated by a camera microcomputer 122. Although the lens microcomputer 110 performs focus lens control, diaphragm control, and the like in addition to that, description thereof will be omitted for the sake of simplification of the drawings. Furthermore, in order to correct hand shake, for example, shaking is detected and corrected with respect to orthogonal axes such as a vertical direction and a horizontal direction, but the same configuration is used for the detection and correction of the shaking associated with the two axes. Thus, description corresponding to one axis will be provided. In this way, the image pick-up apparatus illustrated in FIG. 1 includes an image blur correction apparatus which corrects image blur by driving an optical element in a direction orthogonal to the optical axis as a shake correcting means.

The camera main body 131 includes a shutter 114, an image pick-up element 115 such as a complementary metal-oxide semiconductor (CMOS) sensor, an analog signal processing circuit (AFE) 116, and a camera signal processing circuit 117. Furthermore, the camera main body 131 includes a timing generator (TG) 120 configured to set operation timings of the image pick-up element 115 and the AFE 116. The camera main body 131 includes an operation switch 130 having a power switch, a release switch, and the like. The camera main body 131 includes a camera system control microcomputer (hereinafter referred to as a "camera microcomputer") 132 configured to control the entire camera system, a driver 121 configured to drive a motor for performing a shutter operation, and a shutter driving motor 119.

Also, the camera main body 131 includes a memory card 128 configured to record captured images, a liquid crystal panel (hereinafter referred to as a "liquid crystal display (LCD)") 129 configured to allow monitoring of an image captured by a camera and used to and to display the captured image, and a mount contact part 123 with respect to the interchangeable lens 100. The lens microcomputer 110 and the camera microcomputer 122 perform serial communication via the mount contact parts 113 and 123 at a predetermined timing.

The camera signal processing circuit 117 includes a motion vector detector (motion detection means) 118 configured to detect a motion of the subject on the basis of an image signal output from the image pick-up element. Furthermore, the camera microcomputer 122 includes a shutter control unit 125, a subject angular velocity calculator 126 configured to calculate an angular velocity of a main subject, a panning shutter speed calculator 127, and a subject angle calculator 132.

When the power of the camera is turned on using the operation switch 130, the camera microcomputer 122 detects this state change and supply of power to and initial setting for each circuit in the camera main body 131 are performed under control of the camera microcomputer 122. Furthermore, power is supplied to the interchangeable lens 100 and initial setting in the interchangeable lens 100 is performed under control of the lens microcomputer 110. Moreover, communication is started at a predetermined timing between the controls of the lens microcomputer 110 and the camera microcomputer 122. In this communication, the camera state, photographing settings, and the like are transmitted from the camera microcomputer 122 to the lens microcomputer 110. Furthermore, focal length information, angular velocity information, or the like for a lens is transmitted from the lens microcomputer 110 to the camera microcomputer 122. When the panning assist mode is not selected, the angular velocity sensor 109 detects shaking applied to the camera due to hand shake or the like in the interchangeable lens 100 and the hand shake correction control unit 111 performs hand shake correction control.

Figure 2:
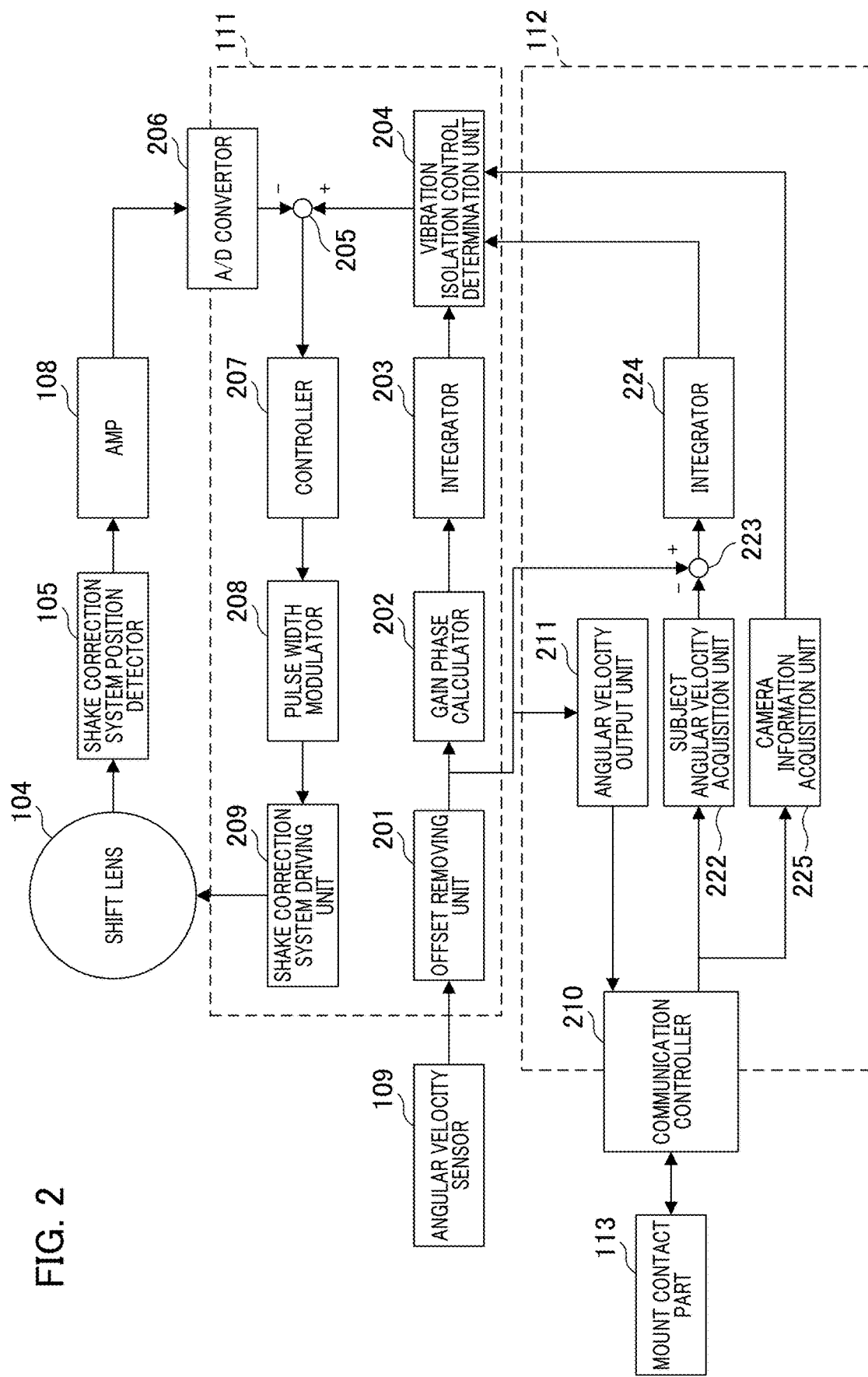
FIG. 2 is a diagram illustrating an example of a configuration associated with hand shake correction control of the image pick-up apparatus.

FIG. 2 is a diagram illustrating an example of a configuration associated with hand shake correction control of the image pick-up apparatus.

Constituent elements that are the same as the constituent elements illustrated in FIG. 1 will be denoted with the same reference numerals and description will be omitted.

As illustrated in FIG. 1, the hand shake correction control unit 111 includes an offset removing unit 201 to a shake correction system driving unit 209. The offset removing unit 201 is, for example, a filter arithmetic unit constituted of a high pass filter (hereinafter referred to as an "HPF") or the like and removes a direct current (DC) component included in an output of the angular velocity sensor 109. A gain phase calculator 202 is constituted of an amplifier configured to amplify angular velocity data whose DC component is removed by the offset removing unit 201 by a predetermined gain and a phase compensation filter. An integrator 203 has a function capable of changing its characteristics in an arbitrary frequency band and integrates an output of the gain phase calculator 202 to calculate an amount of driving of the shift lens 104. A vibration isolation control determination unit 204 switches a control signal for driving the shift lens 104 in accordance with an output of a camera information acquisition unit 225. When an operation mode of the image pick-up apparatus is the panning assist mode, the vibration isolation control determination unit 204 adopts an output of an integrator 224 calculated using the panning control unit 112. When an operation mode is a mode other than the panning assist mode, the vibration isolation control determination unit 204 adopts an output of the integrator 203 calculated using the hand shake correction control unit 111.

The detection result of a position of the shift lens 104 output by the position sensor 105 is amplified by the AMP 108 and is converted into a digital signal by an A/D convertor 206. A subtractor 205 subtracts an output of the A/D convertor 206 from an output of the vibration isolation control determination unit 204 and outputs the subtraction data to a controller 207 as deviation data.

The controller 207 includes an amplifier configured to amplify input data at a predetermined gain and a phase compensation filter. The deviation data which is the output of the subtractor 205 is subjected to signal processing using the amplifier and the phase compensation filter in the controller 207 and then is output to a pulse width modulator 208. The pulse width modulator 208 modulates output data of the controller 207 into a waveform which changes a duty ratio of a pulse wave (that is, a PWM waveform) and supplies the modulated output data to the shake correction system driving unit 209. The shake correction system driving unit 209 is a voice coil type motor for driving the shift lens 104 and drives the shift lens 104 in a direction perpendicular to the optical axis on the basis of the output of the pulse width modulator 208.

The panning control unit 112 will be described below. The panning control unit 112 includes a communication control unit 210 to the camera information acquisition unit 225. When the panning assist mode is set using the operation switch 130, the camera microcomputer 122 switches to panning assist control. Furthermore, information indicating that the panning assist control has switched to the panning assist control is transmitted from the camera microcomputer 122 to the lens microcomputer 110. Thus, the lens microcomputer 110 transitions to the control of the panning assist mode.

When the panning assist mode is set, a setting value of a background panning effect used for calculating a shutter speed for panning is sent to the panning shutter speed calculator 127. Furthermore, a setting value of a subject angle at the time of photographing is sent to the subject angle calculator 132. The camera information acquisition unit 225 acquires setting information of the panning assist mode and release information.

An angular velocity output unit 211 outputs angular velocity data of the angular velocity sensor 109 in the interchangeable lens 100 to the camera microcomputer 122. A subject angular velocity acquisition unit 222 acquires angular velocity data of the main subject calculated by the subject angular velocity calculator 126 in the camera main body 131 via the mount contact part 113 or the communication control unit 210. A subtractor 223 calculates a difference (deviation) between an angular velocity detected in the interchangeable lens 100 and an angular velocity of the main subject detected in the camera main body 131. The integrator 224 integrates the deviation calculated by the subtractor 223.

A method for calculating an angular velocity of the main subject will be described below. The camera main body 131 set in the panning assist mode outputs a motion vector of the subject detected by the motion vector detector 118 in the camera signal processing circuit 117 from information on a captured image. Furthermore, the camera main body 131 receives angular velocity data detected by the angular velocity sensor 109 in the interchangeable lens 100 from the lens microcomputer 110. In panning photographing, there are vectors of two types, i.e., a vector of a subject that a photographer (user) attempts to capture and a vector of a panning background as vectors output from the motion vector detector 118. The camera main body 131 adopts the subject vector of the detected motion vectors of two types while the panning assist mode is being set. A method for adopting a subject vector will be described below with reference to FIGS. 3 and 4.

Figure 3:
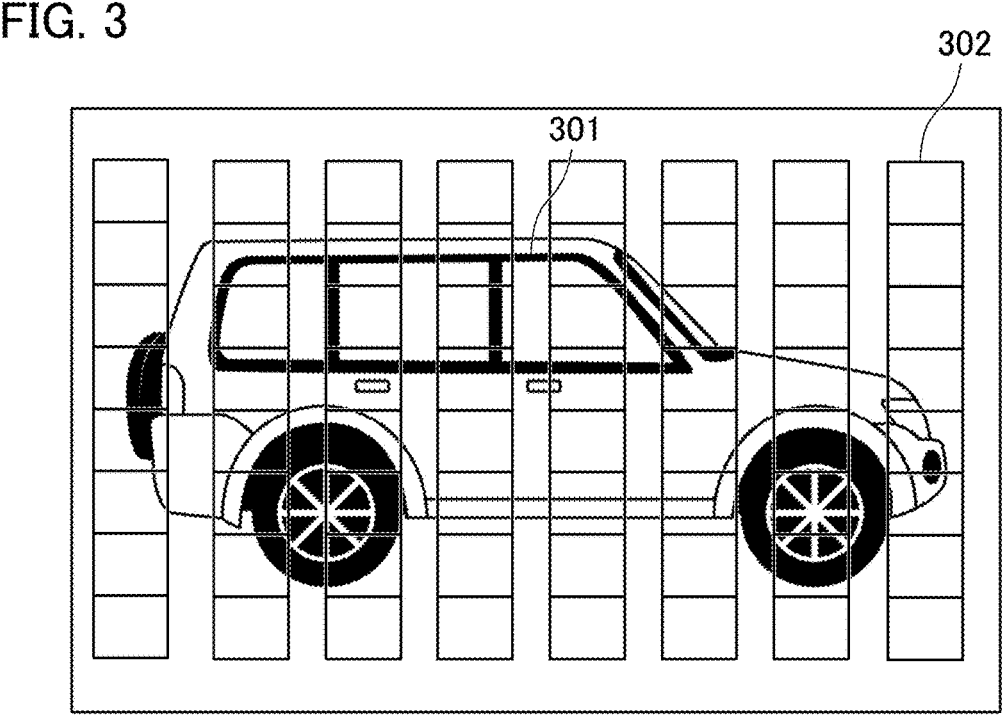
FIG. 3 is a diagram illustrating an example of a panning photographing scene.

FIG. 3 is a diagram illustrating an example of a panning photographing scene.

In the example illustrated in FIG. 3, motion vector detection blocks 302 are disposed on a screen, for example, in eight rows and eight columns. The motion vector detector 118 detects an amount of motion with respect to an image one frame before in the motion vector detection blocks 302. Thus, a vector of a subject 301 and a vector of a background are detected.

Figure 4:
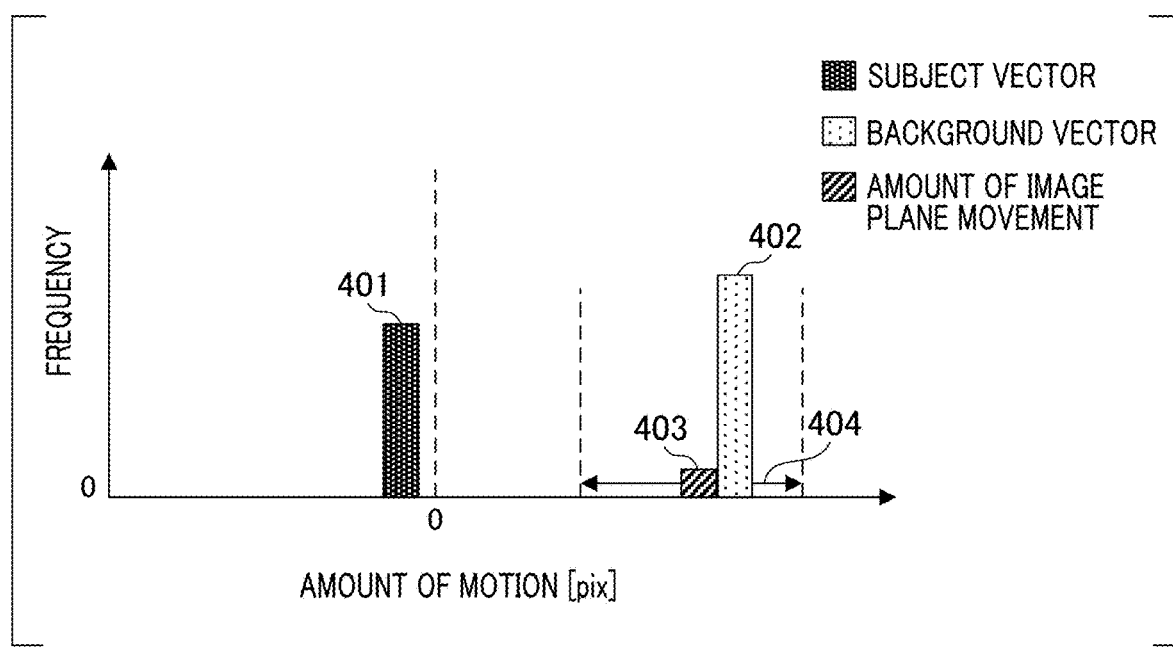
FIG. 4 is a diagram showing a histogram of a vector.

FIG. 4 is a diagram showing a histogram of a vector detected by a motion vector detector.

In the embodiment, in order to accurately isolate a subject vector and a background vector, angular velocity data which is an output of the angular velocity sensor 109 is used. When a photographer successfully traces the motion of the subject, the subject vector is present near 0 pix. Since a photographer who is not familiar with photographing increases an amount of motion of the subject and thus a subject vector is away from 0 pix, it is difficult to distinguish between a subject vector and a background vector. Thus, a subject vector calculator 126 converts the angular velocity data which is the output of the angular velocity sensor 109 into an amount of image plane movement 303 using a focal length or frame rate data. The subject vector calculator 126 determines a vector group present in a certain range (background range) 304 to be a background vector 302 on the basis of the converted value. The subject vector calculator 126 determines a vector group present outside the certain range 304 to be the subject vector 301. When a plurality of subjects are present on a screen, there are a plurality of subject vectors, but in this case, a subject vector closest to a focus frame of the camera is adopted. This is because the photographer necessarily places the focus frame on a subject desired to be captured. As described above, the determined value of the subject vector is an amount of movement above an image plane of the main subject. It should be noted that an output of an angular velocity sensor 124 in the camera main body 131 may be used as angular velocity data used for a histogram.

Figure 5:
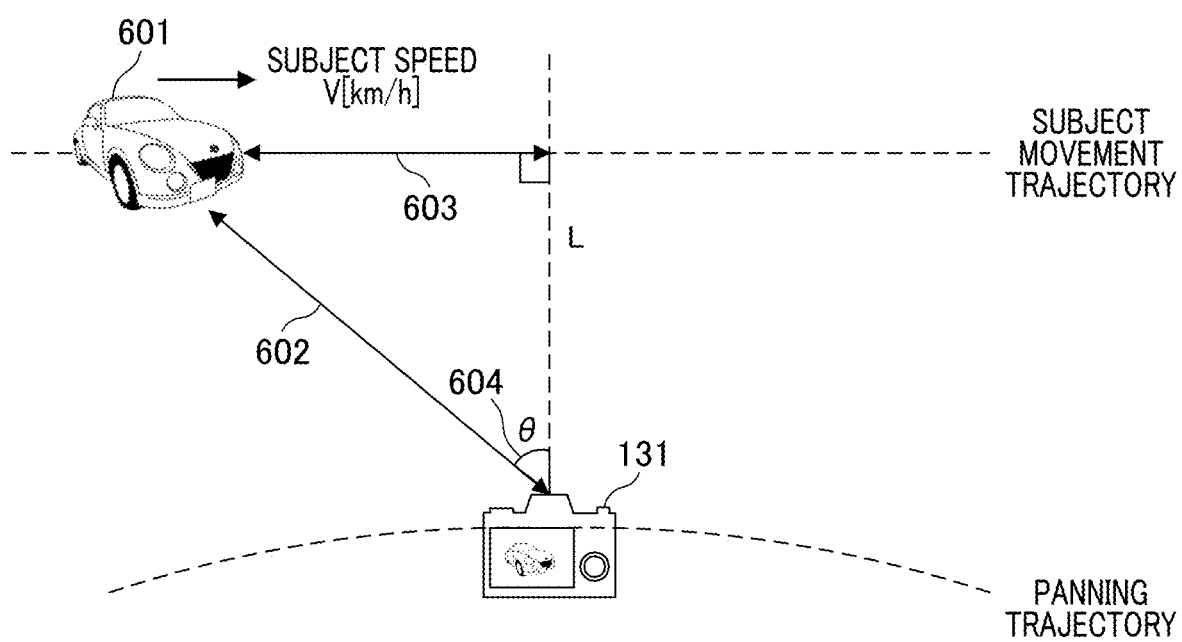
FIG. 5 is a diagram for explaining calculation of a subject angle.

FIG. 5 is a diagram for explaining calculation of a subject angle using the subject angle calculator 132.

The camera main body 131 captures a subject 601 moving at a subject speed V [km/h] in a panning manner at a photographing distance (subject distance) L [m]. A composition in which the subject 601 is to be captured at a certain angle difference with respect to the camera main body 131 is determined in accordance with a value of an angle 604 (subject angle) formed by the subject 601 and the camera main body 131. The subject angle calculator 132 calculates the subject angle θ 604 on the basis of Expression (1). The subject angle θ 604 is an angle of a line 602 which connects the camera main body 131 and the subject 601 with respect to a direction in which the camera main body 131 and the subject 601 is connected to each other when the subject 601 is the closest to the camera main body 131.

$$\theta = \tan^{-1}[Vt/\sqrt{\{L^2 - (Vt)^2\}}] \tag{1}$$

θ is a subject angle [deg]. V is a subject speed [km/h]. t is a unit time (1/frame rate) [sec]. Therefore, Vt is a movement distance of the subject 601 in a unit time. L is a photographing distance [m].

The photographing distance L[m] is calculated, for example, during focus detection processing of an image plane phase difference method. To be specific, when focusing is performed on the subject 601, it is possible to see the number of pixels of a focused place on an image plane. Thus, the photographing distance can be calculated by multiplying the number of pixels by a pixel pitch [um/pix]. It should be noted that the subject angle calculator 132 may calculate the photographing distance L using a distance map indicating a distance distribution for each pixel obtained using a known method. Furthermore, the photographer can set a photographing distance from a menu setting or the like after an operation mode of the camera is the panning assist mode through an operation of the operation switch 130.

When a vector detector 118 is driven at a predetermined frame rate, an amount of motion [pix] of the subject is detected from the vector detection result. Therefore, Vt can be calculated on the basis of a value of an amount of motion of the subject, a pixel pitch [um/pix], and a unit time (1/frame rate) [sec]. A value set by the photographer before photographing may be used as Vt. When the subject angle 604 is 0°, a composition in which the subject 601 is to be captured right beside the camera is provided. When the subject angle 604 is 30°, a composition in which the subject faces the camera toward the front of the subject is provided.

Figure 6:
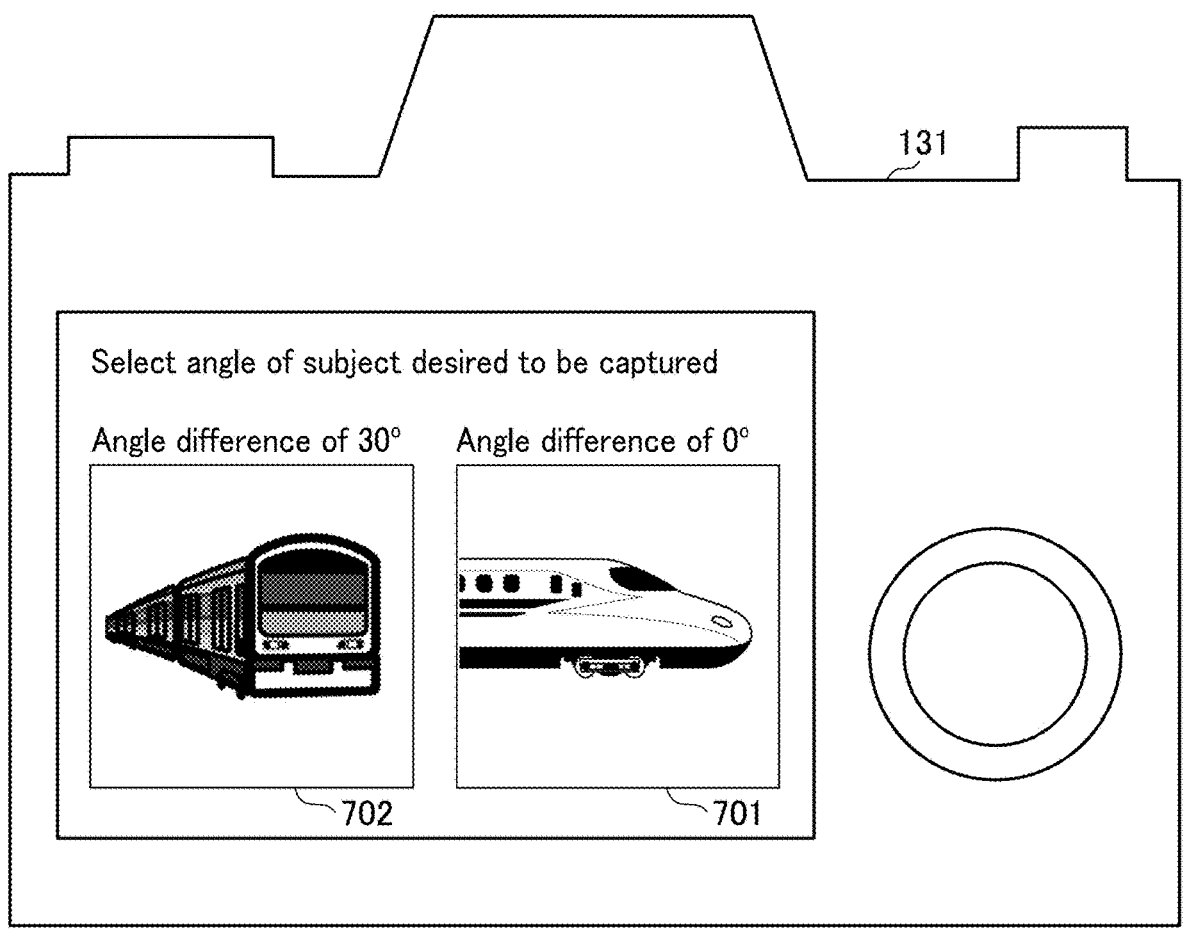
FIG. 6 is a diagram for explaining an example of a method for setting a subject angle.

FIG. 6 is a diagram for explaining an example of a method for setting a subject angle.

The photographer can set an automatic photographing assist from a menu setting or the like after an operation mode of the camera is the panning assist mode through an operation of the operation switch 130. When the automatic photographing assist is effectively set, the camera microcomputer 122 displays a plurality of compositions 701 and 702 in which a subject angle is selected on an LCD 129. That is to say, the camera microcomputer 122 displays a composition according to the subject angle on the screen. In FIG. 6, the number of compositions to be selected is two, but three or more compositions may be displayed. In the composition 702, the subject angle is 30°. In the composition 701, the subject angle is 0°. When the photographer touches any of the compositions on the operation switch 130 or the LCD 129, the camera microcomputer 122 selects the subject angle corresponding to the composition. Of course, the method for selecting the subject angle is not limited to the example illustrated in FIG. 6.

When the subject angle 604 selected using the subject angle calculator 132 is the selected subject angle, automatic photographing is performed under control of the camera microcomputer. When the subject angle 604 falls within a range of the selected subject angle±a threshold value (for example, 1 [deg]), automatic photographing may be set to be performed. Thus, it is possible to perform constant panning on the background and perform panning on the subject at a desired subject angle without subject shake when the photographer merely concentrates on a panning operation. It should be noted that the camera microcomputer 122 may select a plurality of subject angles in accordance with an operation of the photographer and may perform automatic photographing every time the calculated subject angle 604 is each selected angle.

Figure 7:
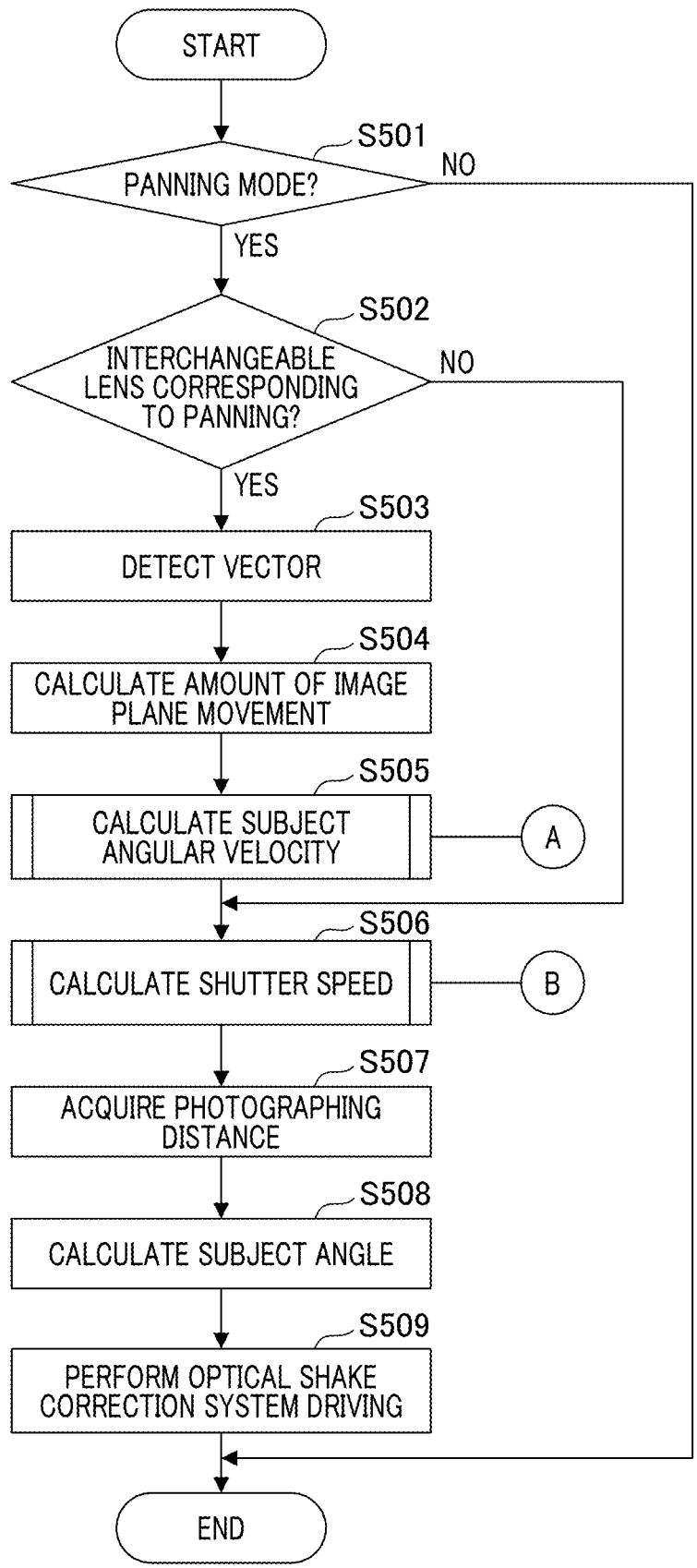
FIG. 7 is a flowchart for describing an example of operation processing of the image pick-up apparatus.

FIG. 7 is a flowchart for describing an example of operation processing of the image pick-up apparatus.

In S501, the camera microcomputer 122 functions as a first detection means for detecting a panning state. To be specific, the camera microcomputer 122 determines whether a mode is set to the panning assist mode in accordance with an operation of the operation switch 130. When it is determined that the mode is not set to the panning assist mode, the process ends. When it is determined that the mode is set to the panning assist mode, the process proceeds to a process of S502.

In S502, the camera microcomputer 122 determines whether the interchangeable lens 100 is an interchangeable lens corresponding to the panning assist mode on the basis of a signal transmitted from the lens microcomputer 110. When it is determined that the interchangeable lens 100 is the interchangeable lens corresponding to the panning assist mode, the process proceeds to a process of S503. When it is determined that the interchangeable lens 100 is not the interchangeable lens corresponding to the panning assist mode, the process proceeds to a process of S506.

In S503, the motion vector detector 118 functions as a second detection means for detecting a motion vector on the basis of a captured image. That is to say, the motion vector detector 118 detects an amount of motion in an image plane as a motion vector. Subsequently, in S504, the subject vector calculator 126 calculates an amount of image plane movement on the basis of angular velocity data of the angular velocity sensor 109 in the interchangeable lens 100, a focal length, and frame rate data. Moreover, the subject vector calculator 126 calculates a subject angular velocity. Subsequently, in S506, the panning shutter speed calculator 127 calculates a shutter speed for panning assist.

In S507, a subject distance calculator 132 acquires a photographing distance. Subsequently, in S507, the subject distance calculator 132 calculates a subject angle using Expression (1) on the basis of the photographing distance acquired in S507 and the amount of motion of the subject acquired from the detection result of the vector.

Subsequently, in S509, the lens microcomputer 110 determines an amount of driving of the shift lens 104 during an exposure period on the basis of the result of the calculation processing of the subject angular velocity in S505 and the shutter speed for panning assist. Moreover, when the subject angle calculated in S508 falls within the range of the setting value±threshold value (for example, 1 [deg]) of the subject angle before photographing, an automatic photographing timing notification is sent from the subject angle calculator 132 to the shutter control unit 125. Thus, when an exposure is started, the shift lens 104 is simultaneously driven by the shake correction system driving unit 107. That is to say, the camera microcomputer 122 functions as a photographing control means for performing automatic photographing when the subject angle is a predetermined angle.

Figure 8:
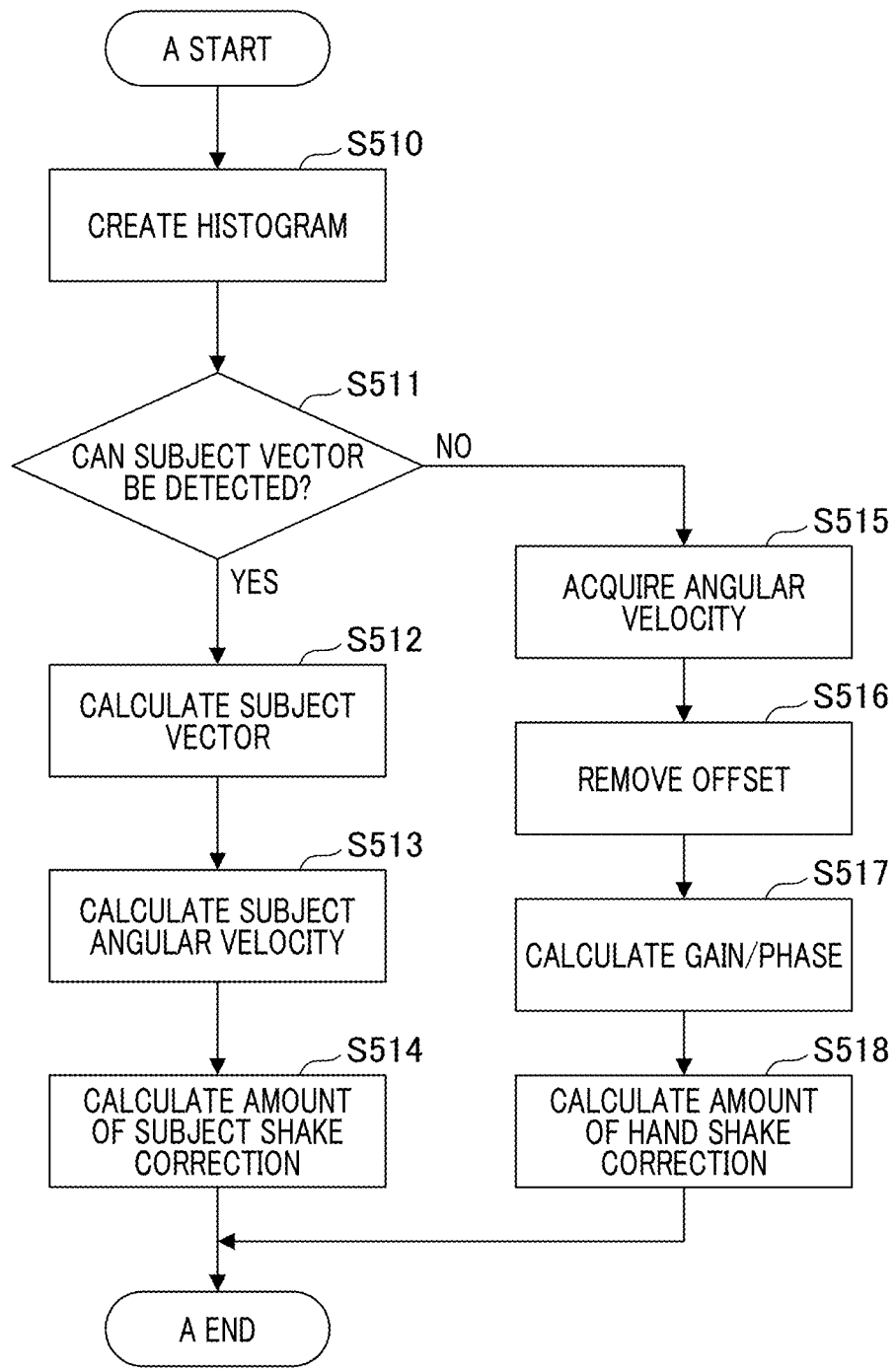
FIG. 8 is a flowchart for describing a process of calculating a subject angular velocity.

FIG. 8 is a flowchart for describing the process of calculating a subject angular velocity in S505 of FIG. 7.

In S510, the subject vector calculator 126 performs histogram calculation of all of the vectors detected in S503 of FIG. 7. Subsequently, in S511, the subject vector calculator 126 determines whether a subject vector can be detected. When it is determined that the subject vector cannot be detected, the process proceeds to a process of S515. When it is determined that the subject vector can be detected, the process proceeds to a process of S512.

A determination criterion of subject vector detection will be described. For example, when a frequency of the subject vector in the histogram illustrated in FIG. 4 is a predetermined threshold value 1 (for example, a frequency of 4 or more), the subject vector calculator 126 determines that the subject vector can be detected. When the frequency of the subject vector is a predetermined threshold value 1 (for example, a frequency of less than 4), the subject vector calculator 126 determines that the subject vector cannot be detected.

In S512, the subject vector calculator 126 calculates a subject vector by integrating detection blocks in a concentric circle using a detection block closest to a focus frame as a starting point. Subsequently, in S513, the subject vector calculator 126 converts the subject vector calculated in S512 into a subject angular velocity.

In S514, the camera microcomputer 122 adds the output of the angular velocity output unit 211 received from the lens microcomputer 110 to the subject angular velocity and transmits the resultant to the lens microcomputer 110 as subject angular velocity data. The panning control unit 112 in the lens microcomputer 110 integrates a difference between subject angular velocity data received from the camera microcomputer 122 and angular velocity data (shake detection signal) of the angular velocity sensor 109 in the interchangeable lens 100 using the integrator 224. Thus, a target control value (amount of subject shake correction) for correcting subject shake is calculated.

Also, in S515, since the subject vector is not detected in S511, the control of the shift lens 104 is switched to hand shake correction control. Moreover, the lens microcomputer 110 acquires angular velocity data which is an output of the angular velocity sensor 109 in the interchangeable lens 100. In S516, the hand shake correction control unit 111 cuts off a low frequency component included in the angular velocity data using an HPF having a function capable of changing a characteristic in an arbitrary frequency band and then outputs a signal in a high frequency band. Thus, a DC component superimposed on the angular velocity data is removed. In S517, the hand shake correction control unit 111 performs signal processing on the angular velocity data from which offset has been removed in S516 using the gain phase calculator 202. Moreover, in S518, the hand shake correction control unit 111 integrates an output of the gain phase calculator 202 by the integrator 203 and sets the integrated output as a target control value (amount of hand shake correction) for hand shake correction control.

Figure 9:
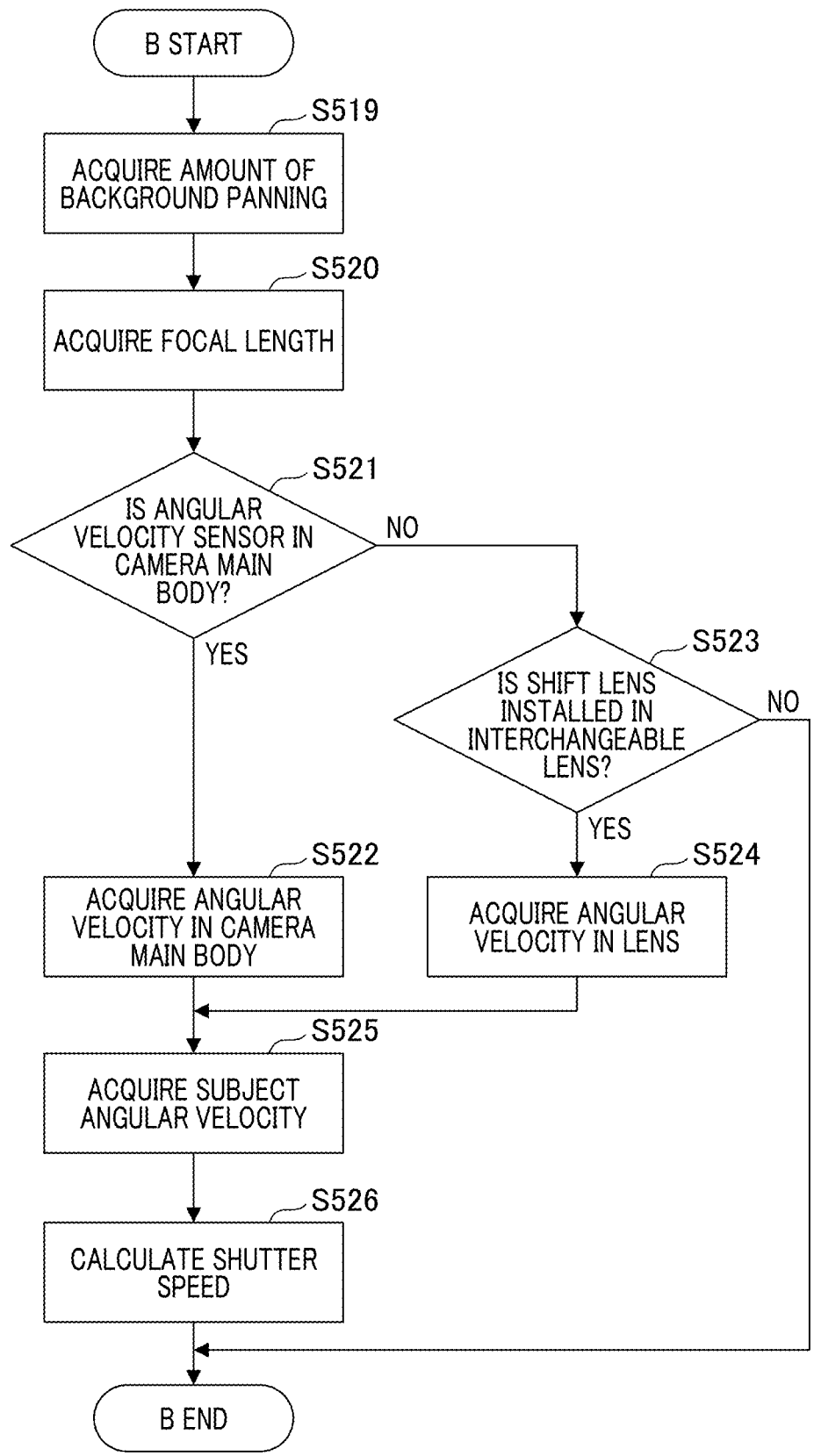
FIG. 9 is a flowchart for describing a process of calculating a shutter speed.

FIG. 9 is a flowchart for describing the process of calculating a shutter speed in S506 of FIG. 7.

In S519, the camera microcomputer 122 acquires a setting value of an amount of background panning set through an operation of the operation switch 130 by the photographer. Subsequently, in S520, the camera microcomputer 122 acquires focal length data from the lens microcomputer 110 in the interchangeable lens 100. In S521, the camera microcomputer 122 determines whether the angular velocity sensor 124 is installed in the camera main body 131. When it is determined that the angular velocity sensor 124 is installed in the camera main body 131, the process proceeds to a process of S522. When it is determined that the angular velocity sensor 124 is not installed in the camera main body 131, the process proceeds to a process of S521.

In S522, the camera microcomputer 122 acquires angular velocity data of the angular velocity sensor 124 in the camera main body 131. Moreover, the process proceeds to a process of S525. In S523, the camera microcomputer 122 determines whether the shift lens 104 is installed in the interchangeable lens 100. When it is determined that the shift lens 104 is installed in the interchangeable lens 100, the angular velocity sensor 109 is installed in the interchangeable lens 100. Therefore, the process proceeds to a process of S524. When it is determined that the shift lens 104 is not installed in the interchangeable lens 100, the angular velocity sensor is not installed in both of the interchangeable lens 100 and the camera main body 131. Thus, the process ends. In S524, the camera microcomputer 122 acquires angular velocity data of the angular velocity sensor 109 from the lens microcomputer 110.

Subsequently, in S525, the panning shutter speed calculator 127 in the camera microcomputer 122 acquires the subject angular velocity calculated in S505 of FIG. 7. When the subject vector is not detected, the subject angular velocity is set to 0 dps. Subsequently, the panning shutter speed calculator 127 calculates a shutter speed for panning assist using Expression (2) on the basis of each data acquired in S519 to S525.

$$TV = \alpha / f(\omega g - \omega s) \quad (2)$$

TV is a shutter speed. $\alpha$ is a background panning effect. f is a focal length. $\omega g$ is a camera angular velocity. $\omega s$ is a main subject angular velocity.

It should be noted that, when the shift lens 104 is not installed in the interchangeable lens 100 in S521, a background angular velocity may be calculated using a background vector from a histogram created in S510 and a shutter speed for panning assist may be calculated on the basis of the calculated background angular velocity. Furthermore, a value (for example 1/60 seconds) programmed in advance using the panning shutter speed calculator 127 may be set as the shutter speed for panning assist.

The angular velocity data received from the lens microcomputer 110 corresponds to a panning speed of the camera. Therefore, when a difference between the received angular velocity data and angular velocity data calculated from an amount of moving of the main subject on an image plane and a current focal length of the lens is calculated, the result is angular velocity data of the main subject with respect to the camera. The camera microcomputer 122 transmits the angular velocity data of the main subject to the lens microcomputer 110 and shake correction control is performed by the lens microcomputer 110 in accordance with setting information of the camera. According to the image pick-up apparatus in the above-described embodiment, it is possible to capture a subject at a desired subject angle in panning photographing. It should be noted that each flowchart is merely an example in the above-described embodiment and the order of some of the steps in each flowchart may be changed and some of the steps may be omitted.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-198305, filed Oct. 12, 2017, which is hereby incorporated by reference wherein in its entirety.

What is claimed is:

1. An image pick-up apparatus comprising:
   a memory;
   one or more processors, wherein the processor functions as the following units according to a program stored in the memory:
   (1) a vector detection unit configured to detect a motion vector on the basis of a captured image;
   (2) an acquisition unit configured to acquire a photographing distance;
   (3) a selection unit configured to select a plurality of predetermined angles;
   (4) a calculator configured to calculate angle information on the basis of a detection result of the motion vector in a panning state and the photographing distance; and
   (5) a photographing controller configured to perform automatic photographing every time angle information calculated by the calculator represents each of the selected predetermined angles.

2. The image pick-up apparatus according to claim 1, wherein the calculator calculates the angle information on the basis of the photographing distance and an amount of motion of the subject acquired on the basis of the detection result of the motion vector.

3. The image pick-up apparatus according to claim 1, wherein the processor further functions as:
   a shake correction unit used for correcting image blur associated with the subject caused by shaking applied to the image pick-up apparatus; and
   a shake correction controller configured to control the shake correction unit on the basis of a subject angular velocity obtained from a detection result of the motion vector.

4. The image pick-up apparatus according to claim 1, wherein the selection unit selects the predetermined angles in accordance with a user's operation.

5. The image pick-up apparatus according to claim 1, wherein the processor further functions as a display control unit which displays a composition according to the predetermined angles on a display unit.

6. A method for controlling an image pick-up apparatus comprising:
   detecting a motion vector on the basis of a captured image;
   acquiring a photographing distance;
   calculating angle information on the basis of a detection result of the motion vector in a panning state and the photographing distance;
   selecting a plurality of predetermined angles; and
   performing automatic photographing every time the calculated angle information represents each of the selected predetermined angles.

* * * * *